INVENTORS:
Robert C. Binning
James M. Stuckey

United States Patent Office 2,958,657
Patented Nov. 1, 1960

2,958,657
METHOD OF SEPARATING HYDROCARBONS USING ETHYL CELLULOSE PERMSELECTIVE MEMBRANE

Robert C. Binning and James M. Stuckey, Texas City, Tex., assignors to The American Oil Company, a corporation of Texas Filed July 16, 1954, Ser. No. 443,895

5 Claims. (Cl. 210—23)

This invention relates to the separation of certain hydrocarbons from mixtures thereof with other hydrocarbons by permeation through a non-porous membrane and it pertains more particularly to the use of an improved type of non-porous membrane.

It has heretofore been proposed that certain hydrocarbons be separated from hydrocarbon mixtures by permeation through membranes of rubber, chloroprene, neoprene, and the like, but the selectivities and/or permeation rates of such membranes were so low that the processes were commercially impracticable. An object of this invention is to provide a practical hydrocarbon permeation process of such improved selectivity and permeation rate that it can be employed on a commercial scale for separating mixtures of hydrocarbons according to type and/or molecular configuration and/or boiling point. A more specific object is to provide a simple, inexpensive method and means for concentrating aromatics and/or olefins from gasoline boiling range hydrocarbon mixtures and/or to separate branched-chain paraffins such as iso-octane from normal paraffins such as normal heptane in order that a naphtha fraction may be effectively separated into components of high octane number and low octane number, respectively. Other objects will become apparent in the course of the detailed description of the invention.

It has been discovered that hydrocarbon mixtures may be rapidly and effectively separated according to type, i.e., aromatic, unsaturated, saturated hydrocarbons, and/or molecular configuration and/or boiling point by causing a portion of the mixture to permeate through a non-porous membrane comprised of certain cellulose ethers under defined conditions. For obtaining rapid selective permeation, a thin non-porous membrane is employed which is less than 10 mils and preferably 0.2 to 5 mils in thickness and comprised of cellulose ethers containing alkoxyl radicals of a type and in a quantity to permit certain of the hydrocarbons to dissolve in the membrane without rendering the membrane so soluble in the hydrocarbons as to rupture during the permeation process. The cellulose ethers are obtained by substituting the H of a portion of the OH groups in the cellulose molecule with hydrocarbon radicals of which a substantial portion contain at least 2 carbon atoms. The cellulose molecule consists of recurring units each of which contains 3 OH groups and which have the chemical formula $C_6H_{10}O_5$. A sufficient number of these OH groups must be converted to OR groups (where R is a straight-chain, branched-chain or cyclic-hydrocarbon radical containing about 2 to 8 carbon atoms and is preferably an alkyl radical having 2 to 4 carbon atoms) so that the resulting membrane will dissolve at least certain of the hydrocarbons in the mixture to be separated but sufficient OH groups must be left in the cellulose ether to prevent solution of the film by the hydrocarbon mixture to the extent that the film is ruptured. Examples of such cellulose ethers are ethyl cellulose, propyl cellulose, butyl cellulose, amyl cellulose, methyl-ethyl cellulose, ethyl-butyl cellulose, methyl-amyl cellulose, benzyl cellulose, and the like. Methyl cellulose does not dissolve any of the hydrocarbon components sufficiently to make it useful in a commercial hydrocarbon separation system. Ethyl cellulose, on the contrary, is remarkably effective when it contains sufficient hydroxyl groups to avoid solution to the point of rupture. In general, the higher the average number of free (non-reacted) hydroxyl groups per cellulose unit, the lower will be the rate of hydrocarbon permeation through the membrane; whereas decreasing the average number of free hydroxyl groups by increasing the alkoxyl content increases the rate of hydrocarbon permeation but also increases the possibility of solution of the membrane in the hydrocarbons to the point of rupture. The average number of hydroxyl groups required per cellulose unit in order to avoid rupture of the membrane during the permeation process varies with the permeation temperature and with the nature of the hydrocarbons in contact with the membrane, higher hydroxyl contents being required at higher permeation temperatures and higher hydroxyl contents being required for high concentrations of aromatic and unsaturated hydrocarbons than are required for separating normal from branched-chain paraffins. In the case of ethyl cellulose, the average number of free or unaltered hydroxyl groups should usually be in the range of 5 to 50%, preferably in the range of 10 to 35%, of the hydroxyl groups originally present in the cellulose. This corresponds to substituting 2.85 to 1.5, preferably 2.7 to 2.1, of the three hydroxyl groups contained per cellulose unit with ethoxyl groups. On the basis of the ethoxyl content it would correspond to approximately 53 to 33%, preferably 51 to 40% for example less than 47% by weight, of ethoxyl groups per cellulose unit. When a methyl-ethyl cellulose membrane is employed, at least about 25 percent of the substituting radicals should be ethyl groups and fewer unreacted OH groups are required. When propyl, butyl or higher molecular weight hydrocarbon radicals replace the H of the OH groups contained in the cellulose molecule, a correspondingly larger amount of OH groups must be left in the cellulose ether in order to prevent its solution in the hydrocarbon mixture to the point of rupture.

The membrane employed in non-porous, i.e., free from holes and other defects which destroy a continuous surface. If the membrane has pinholes or the like which allows hydrocarbons to leak through, the selectivity of the permeation process is reduced or eliminated. Not only may the membrane be formed from mixed cellulose ethers such as methyl-ethyl cellulose, but it may be formed from mixed cellulose ether-esters such as ethyl cellulose butyrate wherein a portion of the hydroxyl groups are transformed into ethoxyl groups and a portion of the hydroxyl groups are esterfied to form butyryl groups. The separation of hydrocarbons from a mixture of hydrocarbons by permeation through a non-porous membrane comprised of certain carboxylic acid esters of cellulose is described and claimed in copending Serial No. 443,894 filed on even date herewith. Membranes prepared from cellulose ethers are superior to membranes prepared from the aforementioned cellulose esters in that remarkably higher rates of permeation, particularly of paraffinic hydrocarbons, with good selectivity are obtained. The membrane may also be formed from physical mixtures of different cellulose ethers or physical mixtures of cellulose ethers and cellulose esters. The membranes may be formed by conventional techniques such as extrusion or by casting from a solution of the cellulose ether in a solvent system, e.g., a mixture of ethylene dichloride, acetone, and methyl-ethyl ketone. Other ingredients such as antioxidants, stabilizers, plasticizers, and the like may be contained in the membrane to improve its strength, flexibility, physical stability, to increase the rate of permeation and/or selectivity, or for other purposes, provided that the composition of such ingredients and the amounts in which they are employed are not such as to render the membrane impermeable to hydrocarbons and/or eliminate the selectivity of the membrane. Supports such as fine mesh wire screen or the like may be used as backing materials to minimize the chances of rupturing the membrane.

The invention has broad application to the separation of mixtures of hydrocarbons into fractions having different concentrations of the component hydrocarbons than were contained in the original mixture. Hydrocarbon mixtures can be separated into fractions having differing concentrations of hydrocarbons of a particular type, i.e., aromatics, unsaturated, and saturated hydrocarbons. The various types of hydrocarbons permeate more rapidly through the membrane in the following order: saturated hydrocarbons, unsaturated hydrocarbons, aromatic hydrocarbons. This separation of hydrocarbons by type can be accomplished to a striking degree when narrow boiling hydrocarbon mixtures are employed as the feed mixture. The process of this invention is also capable of separating hydrocarbon mixtures into fractions according to the structural configuration of the hydrocarbon molecules present in the feed hydrocarbon mixture. Thus hydrocarbons can be separated according to their molecular configuration into cyclic-, branched-chain, and straight-chain hydrocarbons, the particular configuration permeating more rapidly through the membrane in the order listed when the hydrocarbons have the same number of carbon atoms. Branched-chain hydrocarbons may be separated into fractions having a low degree of branching and fractions having a higher degree of branching, the former permeating more rapidly. Separation according to molecular configuration is particularly effective when the hydrocarbons are of the same type such as either olefins or paraffins. A separation can also be made between hydrocarbons based upon their molecular weights, the lower molecular weight hydrocarbon permeating through the membrane more rapidly than the higher molecular weight hydrocarbon. The separation of hydrocarbons according to molecular weight is preferably accomplished when using hydrocarbons of the same type and molecular configuration, e.g., cyclohexane from methylcyclohexane. Lower boiling hydrocarbons tend to permeate the membrane more rapidly than higher boiling hydrocarbons. The separations discussed supra are most advantageously performed using a narrow boiling mixture, e.g., boiling within about 20–30° C., although wider boiling mixtures of hydrocarbons may be employed. An especially preferred hydrocarbon mixture boils within the gasoline boiling range and has a boiling range of about 15° C. It is apparent that by combinations of fractionation and permeation complex mixtures of hydrocarbons such as petroleum can be separated into the individual hydrocarbons.

Examples of suitable mixtures of hydrocarbons are natural or refined mineral oils. For example, a petroleum distillate such as gasoline may be separated into a permeate having a higher octane number than the original gasoline and higher than the non-permeated portion of gasoline. Among the gasoline components which may be so treated are naphtha fractions such as virgin naphtha, naphtha obtained from thermal cracking or from catalytic conversion processes such as catalytic cracking, catalytic hydroforming, and the like. Charging stocks to various petroleum conversion processes may be treated to remove undesirable components, e.g., a cycle oil from the cracking of gas oil may be processed in accord with this invention to remove as a permeate certain materials which increase the rate of coke deposition on catalysts when the cycle oil is catalytically cracked to produce further amounts of gasoline. Preferred charging stocks to the process of this invention are those boiling within the gasoline boiling range. Normally liquid fractions which boil within this range are suitable charging stocks for segregation into a permeate fraction enriched in aromatics and olefins and a non-permeated fraction having a higher concentration of paraffinic hydrocarbons. Narrow boiling fractions such as a mixture of benzene or toluene with iso-octane can be separated into a permeate fraction having a concentration of the aromatic hydrocarbon greater than that contained in the non-permeated hydrocarbons or in the initial mixture. A mixture of olefins and paraffins such as hexene or heptene with hexane or heptane may be separated into a permeate fraction having a higher concentration of olefins than is contained in the non-permeated fraction. Likewise, cyclohexene may be separated from a cyclohexane. Straight-chain paraffins may be separated from branched-chain paraffins or from cycloparaffins in this same fashion. Diolefins such as butadiene or isoprene can be obtained in concentrated form in the permeate from a mixture with olefins and/or paraffins. Butane can also be concentrated in the permeate from mixtures thereof with pentane or hexane.

The permeation process is carried out by contacting one side of the membrane with the hydrocarbon mixture which may be in the liquid or vapor state and removing permeated hydrocarbons from the opposite side of the membrane in either the liquid or vapor state. The hydrocarbon mixture may be continuously introduced into the charging zone so that it contacts one side of the membrane and non-permeated hydrocarbons may be continuously removed from this zone after having contacted the membrane. Permeated hydrocarbons may be continuously withdrawn from the permeate zone. It is believed that permeation occurs because the concentration of permeating hydrocarbons at the surface of the membrane on the permeate side is less than the concentration of the permeating hydrocarbons at the surface of the membrane in the charging zone. Thus, the permeated hydrocarbons should be rapidly removed from the surface of the membrane in the permeate zone to insure rapid permeation of the hydrocarbons. This may be accomplished by removing permeated hydrocarbons from the surface of the membrane on the permeate side or by diluting permeated hydrocarbons in this zone with a diluent or sweep gas or liquid, for example, steam, air, and the like. When liquid-liquid systems are employed on opposite sides of the membrane, a diluent or sweep liquid is circulated about the permeate surface of the membrane. When permeate hydrocarbons are obtained in the permeate zone in the vapor state, the permeate hydrocarbons may be removed from the permeate zone by employing a lower pressure than exists on the charging side or by using a sweep gas to dilute and/or remove the permeated hydrocarbons. When the hydrocarbons in both the charging zone and the permeate zone are in the vapor phase, a pressure differential is employed to facilitate the permeation of the hydrocarbons. Pressure differentials of from 10 mm. Hg to as high as 100 p.s.i.g., dependent upon the strength of the membrane and the effectiveness of the manner in which it is supported, may be used. Under such operating conditions, the pressure may be super atmospheric, atmospheric, or sub-atmospheric, dependent upon the pressure differential existing between the two zones. It is preferred to operate the permeate zone at sub-atmospheric pressures so that the permeated hydrocarbons when removed in the vapor state are easily evaporated. The preferred mode of operating the permeation process consists of contacting the feed mixture of hydrocarbons while in the liquid state with the membrane and removing the permeate in the form of a vapor from the permeate zone. This permeate may be removed by employing a reduced pressure in the permeate zone or by sweeping the vapors of the hydrocarbons with a gas such as air. It has been found that when operating the permeation process in this preferred manner it is possible to obtain increased rates of permeation of about 40% higher than those obtainable by having the hydrocarbons in the vapor state on both sides of the membrane. If desired, it is possible to operate with the pressure differential maintained across the membrane to insure rapid permeation of the hydrocarbons and also to use a sweep gas or liquid, whichever is called for by the conditions, to increase the permeation rate.

While the invention is not to be limited by the following theory, it is believed that the permeation of hydrocarbons through the membrane consists of three stages: (1) solution of the hydrocarbons in one side of the membrane, (2) permeation of the hydrocarbons through the membrane, and (3) removal of the hydrocarbons from the opposite side of the membrane. The selectivity which the membrane exhibits toward the hydrocarbons undergoing permeation is believed to be determined in the first stage, since there is no appreciable change in selectivity with a variation in thickness of the membrane. The rate of permeation of the hydrocarbons varies inversely with the thickness of the membrane, but if the membrane is thicker than about 10 mils the permeation rate is reduced to an almost negligible level. To obtain the highest rates of permeation of the hydrocarbons it is preferred to employ the thinnest membrane possible which has the necessary strength to avoid rupturing under the conditions of pressure differential, temperature etc., used in the permeation process. It should be less than about 5 to 10 mils and may be as thin as about 0.5 mil or less. Supports such as fine mesh wire screen, porous sintered metals or ceramic materials may be used as backing or supporting materials to assist in minimizing the chances of rupturing the membrane while yet employing as thin a membrane as possible.

The rate of permeation of hydrocarbons through the membrane varies directly with the temperature. An increase in the operating temperature of about 10° C. will increase the rate of permeation of the hydrocarbons through the membrane by as much as 100%. The effect of temperature on the rate of permeation of individual hydrocarbons is not necessarily the same, and it may vary for various hydrocarbons. It may generally be said that an increase in the operating temperature of the permeation process will increase the rate of permeation with little or no effect on the selectivity of the membrane for the various hydrocarbons. However, as the operating temperature is increased there is an increase in the tendency of the membrane to soften to the point of rupture or dissolve. The permeation process is preferably operated at as high a temperature as possible to obtain maximum permeation rates without causing the membrane to soften to the point of rupture or dissolve. The permeation process may be operated at a temperature of from about 0° C. to about 150° C., preferably between about 50° C. to 120° C.

The type of hydrocarbons and the relative concentration in which certain types of hydrocarbons contact the membrane, the operating temperature of the permeation process, and the composition of the membrane effect the stability of the membrane during the permeation process, i.e., the likelihood of softening of the membrane to the point of rupture or dissolving of the membrane. Aromatic hydrocarbons such as benzene, toluene, dimethyl naphthalenes, and the like and to a lesser extent the unsaturated hydrocarbons, tend to cause the membrane to soften. This effect is more pronounced as their concentration in the hydrocarbon mixture is increased, especially in regard to their concentration in liquid feed hydrocarbon mixtures to the permeation process. The effect of paraffinic hydrocarbons in this regard is materially less than the aromatic and unsaturated hydrocarbons. When hydrocarbons are obtained in the permeate zone in the vapor phase, the concentration of the aromatic and/or unsaturated hydrocarbons is of much lesser importance since they are rapidly carried away from the surface of the membrane. As was pointed out previously, increasing the operating temperature of the permeation process increases the possibility of the membrane softening to the point of rupture. The composition of the membrane itself will affect the maximum temperature at which the permeation process can be operated and the concentration of aromatic and unsaturated hydrocarbons which can be tolerated without softening of the membrane to the point of rupture. As more alkoxyl groups are introduced into the cellulose molecule (with a consequent decrease in the number or concentration of free or unaltered hydroxyl groups) there is an increased tendency for the cellulose ether membrane to soften to the point of rupture. The higher the molecular weight of the introduced alkoxyl group, the greater is this tendency. For example, a membrane composition of ethyl cellulose having an average number of 2.21 to 2.28 ethoxyl groups substituted for the three hydroxyl groups contained in each cellulose unit (corresponding to 26.4% to 24% unaltered hydroxyl groups, and an ethoxyl content of 44.5 to 45.5% by weight) will soften to about the point of rupture if the concentration of toluene in a feed mixture of toluene-n-heptane is more than about 40% when operating at a temperature of 90° C., and when the concentration of toluene is more than about 70% it will soften to about the point of rupture when operating at a temperature of 50° C. If using a membrane composed of ethyl cellulose which has an average number of 2.42 to 2.53 ethoxyl groups substituted for the three hydroxyl groups contained in each cellulose unit (corresponding to 19.3% to 15.7% unaltered hydroxyl groups and an ethoxyl content of 47.5 to 49% by weight) the membrane will soften to about the point of rupture at about 90° C. when using a feed of n-heptane, it will soften to about the point of rupture at about 50° C. when using a feed consisting of more than about 10% toluene in n-heptane, and it will soften to about the point of rupture at about 25° C. when using a feed consisting of more than about 20% toluene in n-heptane.

The rate of selective permeation of hydrocarbon mixtures, such as mixtures of paraffinic hydrocarbons of differing molecular configuration, through non-porous membranes may be increased by contacting the membrane during the permeation process with an added aromatic and/or unsaturated hydrocarbon. This method has applicability which is broad to those membranes which display the ability to permeate selectively certain hydrocarbons. This subject matter is claimed in copending application Serial No. 465,495.

The rate of selective permeation of hydrocarbons through non-porous membranes can be increased manyfold by contacting the membrane during permeation with a non-hydrocarbon solvent material, e.g., oxygenated compounds such as alcohols, ethers, alcohol ethers, esters, ketones, acetals, and the like, and chlorinated compounds such as trichloroethylene, propylene chloride and the like. This method for increasing the rate of permeation has broad applicability to all membranes which permit certain hydrocarbons to permeate selectively. This subject matter is claimed in copending application Serial No. 465,497.

The permeation process may be operated as a batch or continuous operation. It is of course essential that only a portion of the feed hydrocarbon mixture be allowed to permeate. The larger the portion that is allowed to permeate in a single stage, the poorer the degree of separation; whereas the smaller the proportion which is allowed to permeate, the greater the degree of separation. When operating continuously, the proportion of permeating hydrocarbons may be adjusted by adjusting the rate of introduction of the feed hydrocarbons. Permeated hydrocarbons are preferably continuously removed from the permeate zone. Permeated hydrocarbons may be further separated into fractions containing the desired hydrocarbons in more concentrated form by passing the permeated hydrocarbons to further permeation stages.

Non-permeated hydrocarbons may be similarly treated. The membrane may be used in the form of sheeting or tubing, or the membrane may be laid down in any form or arrangement which preferably provides a maximum surface to volume ratio.

The invention will be more clearly understood from the following description and from the accompanying drawings.

Figures 1, 2:
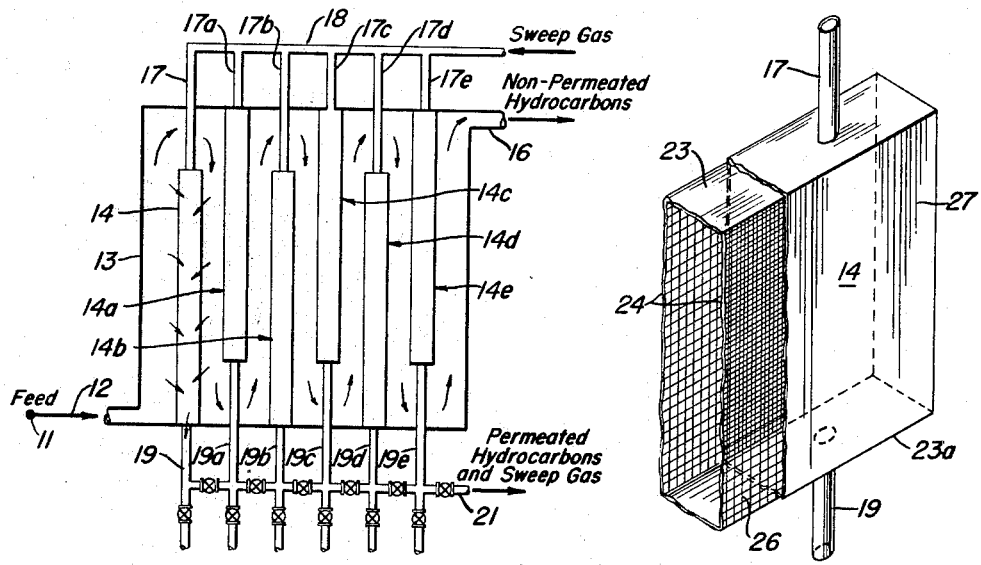
Figure 1 is a diagrammatic drawing of an apparatus and process which illustrates a preferred embodiment of the process of this invention for separating a stabilized catalytically cracked naphtha into a permeate fraction having a higher octane number than the feed naphtha and a non-permeated fraction having a lower octane number than the feed.
Figure 2 is an isometric view of one of the permeation cells shown in Figure 1.

Referring to Figure 1, the feed which consists of a stabilized catalytically cracked naphtha is passed at a temperature of about 70° C. from source 11 by way of line 12 into permeation unit 13 which contains a battery of premeation cells 14, 14a, 14b, 14c, 14d, and 14e. The feed in permeation unit 13 is in the liquid phase and is maintained at approximately 70° C. The feed entirely fills the unit, surrounding the individual permeation cells. Introduced feed travels a tortuous path, passing upwardly along one side of a permeation cell and in a downward direction along the opposite side of the permeation cell and so forth until the remaining non-permeated hydrocarbons are removed by way of line 16 from the permeation unit 13. The feed rate is adjusted so that only a small fraction of non-permeated hydrocarbons are obtained. Each permeation cell, which consists of a box-like apparatus wherein the outer surface comprises a non-porous membrane of Hercules G–100 ethyl cellulose having an ethoxyl content of about 44.5–45.5% and being about 0.2 mils in thickness, is attached to the inside walls of permeation unit 13. The supporting means for the membrane, which will be more fully described in connection with Figure 2, is contained in the permeation cell to prevent rupturing of the mebrane during the process of permeation. The permeation cells 14, 14a, etc., are attached at the bottom and top to the walls of permeation unit 13 with a space provided either above or below the cells to provide a torturous path for the feed naphtha. Such a pathway is desired to obtain high contact times of feed with the membrane per volume of permeation unit, and to prevent localized differences in concentration of the components of the feed at different places on the membrane. Each permeation cell, 14, 14a, 14b, 14c, 14d, and 14e is provided at its top with an inlet 17, 17a, 17b, 17c, 17d, and 17e respectively, which in turn is connected to header 18. A sweep material, herein air, is passed into header 18 and thence by way of lines 17, 17a, 17b, 17c, 17d, and 17e into permeation cells 14, 14a, 14b, 14c, 14d, 14e respectively, to sweep the permeated hydrocarbons from the inner surface of the ethyl cellulose membrane. The use of a sweep material is not essential, but it is preferred to employ it in order to increase the rate of permeation of the hydrocarbons through the membrane. The permeating hydrocarbons within the permeation cells 14, 14a, etc., are maintained in the vapor phase by maintaining a low absolute pressure, herein 30 mm. Hg absolute, in the inside or permeate zone of the permeation cells. An absolute pressure of slightly higher than atmospheric is maintained on the feed side of the membrane. The mixture of permeated hydrocarbon vapors and air sweep gas is removed from each permeation cell 14, 14a, 14b, 14c, 14d, and 14e by way of lines 19, 19a, 19b, 19c, 19d, and 19e respectively. The hydrocarbons contained in the mixtures withdrawn from each permeation cell may be separately condensed and recovered or passed into header 21 and combined, and then passed to condenser not shown wherein the permeated hydrocarbon vapors are condensed and recovered from their gaseous mixture with air. The low absolute pressure or vacuum is maintained with permeation cells 14, 14a, 14b etc., by vacuum pumps not shown but attached to lines 19, 19a, 19b etc., respectively and/or to header 21. The pumps also serve to withdraw permeated hydrocarbons and the sweep gas air from the permeation cells and pass the mixture to the condensers where the permeated hydrocarbons are recovered. The permeated hydrocarbons withdrawn from permeation cell 14 have a higher octane number than the feed hydrocarbons, a higher octane number than the non-permeated hydrocarbons, and also a higher number than the permeated hydrocarbons withdrawn from permeation cell 14a. The permeated hydrocarbons withdrawn from permeation cell 14a in turn have a higher octane number than the permeated hydrocarbons withdrawn from permeation cell 14b and so forth, until permeated hydrocarbons which are withdrawn from permeation cell 14e have a lower octane number than the feed hydrocarbon. The low octane fractions may thus be removed from the higher octane permeated fractions to provide a higher octane number gasoline fraction, or the high octane number permeated fractions may be used as blending components to increase the octane number of gasoline. If a still higher octane number naphtha is desired, the process may be repeated on the various permeated hydrocarbon fractions in a second, third or fourth stage.

Figure 2 is an enlarged isometric view of a partial cross section of permeation cell 14. It comprises two end plates 23 and 23a which are joined at corresponding corners with connecting means 24 to form a thin rectangular box-like framework. A very fine mesh wire screen 26 surrounds the framework and provides a supporting means for the ethyl cellulose membrane 27. Inlet pipe 17 for the sweep gas is attached to end plate 23 at the top of the permeation cell. Outlet pipe 19 for the permeated hydrocarbon vapors and the sweep gas air is attached to end plate 23a. The ethyl cellulose membrane covers the fine wire mesh supporting means 26 so as to provide a continuous surface of the membrane which is free of any cracks or openings.

Figure 3:
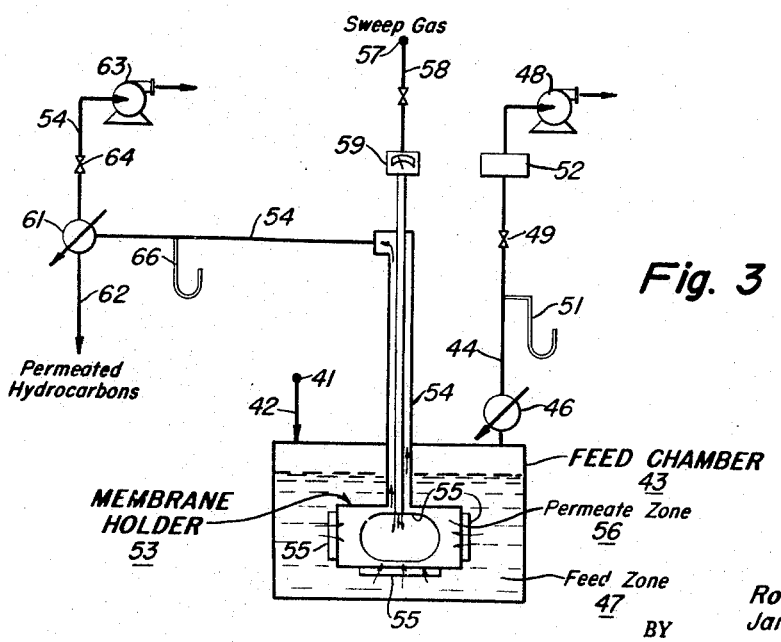
Figure 3 is a diagrammatic representation of the apparatus employed in practicing the invention on a small scale.

Figure 3 diagrammatically represents a form of apparatus used in practicing the invention on a small scale. The hydrocarbon mixture feed is passed from source 41 by way of line 42 into feed chamber 43. Line 44 is connected through a condenser 46 to the top of chamber 43. Condenser 46 is employed in this line to condense any vaporized hydrocarbons which may tend to leave the feed zone 47, particularly when refluxing the feed hydrocarbons. Vacuum pump 48 is attached to line 44 to control the absolute pressure in feed zone 47 at any amount less than atmospheric. Needle valve 49 is contained in line 44 to assist in maintaining the desired absolute pressure in feed zone 47. The absolute pressure in line 44 and feed zone 47 is determined by manometer 51 attached to line 44. Any hydrocarbon vapors which escape condensation in condenser 46 are collected in trap 52. Membrane holder 53 is positioned within feed chamber 43 and has a box-type design with a circular opening in each of five of its faces. A threaded brass ring surrounds each opening and extends outwardly from the plane of the surface of the membrane holder to form a cylindrical extending threaded wall with a flat shoulder. A fine mesh screen wire is supported and soldered across each opening and then the ethyl cellulose membrane is placed over each of the openings. A knurled brass ring fitting threaded on the inside is then used to seal the membrane to the shoulder of the cylindrical wall and thus seal the outer edge of the membrane with a screw type seal. A line 54 is attached to the top face of membrane holder 53 for the withdrawal of hydrocarbons which permeate from feed zone 47 through the membrane 55 into permeate zone 56. Sweep gas from source 57 is passed by way of valved line 58 through flowmeter 59 into permeate zone 56 to dilute the hydrocarbons contained therein and/or assist in removing them from the interior surface of the membrane. Permeated hydrocarbons together with the sweep gas, if used, are removed in the vapor state from permeate zone 56 by means of line 54 and passed through an acetone-Dry Ice condenser 61 wherein permeated hydrocarbons are recovered and removed therefrom by way of line 62. The permeated hydrocarbons are removed from permeate zone 56 by maintaining a lower absolute pressure therein than is contained in feed zone 47. The absolute pressure is controlled in permeate zone 56 by a vacuum pump 63 in line 54. Needle valve 64 and manometer 66 are contained in line 54 to assist in regulating and measuring the absolute pressure contained therein and in permeate zone 56. The level of feed in feed zone 47 may be controlled so as to provide a vapor space between it and the membrane 55 contained in the membrane holder 53 or if desired, the feed may be contained in feed zone 47 so as to cover all surfaces of the membrane with liquid hydrocarbon feed. By regulating the pressure, the pressure differential, and temperature, it is possible to operate so that liquid hydrocarbons surround the membranes in the feed zone and vaporized hydrocarbons are withdrawn through the membrane into the permeate zone 56 and removed therefrom by means of line 54 and recovered from condenser 61.

The above described apparatus was employed in performing a number of experiments related to this invention. A series of experiments were performed wherein membranes prepared from different cellulose ethers were used. In obtaining these data, a hydrocarbon mixture feed consisting of 50 volume percent n-heptane and 50 volume percent isooctane was used. The permeation process was operated so that the hydrocarbons were in the liquid state in the feed zone and in the vapor state in the permeate zone. A pressure differential of 730 mm. Hg was maintained across the membrane. The membranes, which were tested under approximately comparable conditions, were methyl cellulose having a methoxyl content of about 30%; Dow 610 which is an ethyl cellulose having an ethoxyl content of about 45–46% and containing some anti-oxidant, plasticizer and stabilizer; Hercules Ethocel G–100 which is an ethyl cellulose having an ethoxyl content of about 44.5–45.5%; and Hercules Ethocel N–50 which is an ethyl cellulose having an ethoxyl content of 47.5–49.0%.

Table I

| Membrane | Run No. | Temp., °C. | Membrane Thickness in Mils | Vol. Percent, n-Heptane in Permeate | Rate of Permeation, Gal./Hr./ 1,000 Sq. Ft. Membrane |
|---|---|---|---|---|---|
| Methyl Cellulose | 1 | 82 | 1.5 | (¹) | less than 0.2. |
| Ethyl Cellulose (Dow 610). | 2 | 80 | 3.0 | 70 | 26. |
| Ethyl Cellulose (Hercules G-100). | 3 | 80 | 1.5 | 75 | 38. |
| Ethyl Cellulose (Hercules N-50). | 4 | 80 | 1.5 | 70 | 109. |

¹ Permeate sample too small to analyze.

The above data show that methyl cellulose is practically impermeable to hydrocarbons, whereas the hydrocarbons permeate through ethyl cellulose at a rapid rate. It will be observed from the data that although the selectivity is not far different when using the ethyl cellulose membranes of varying ethoxyl content, the rate of permeation increases with increasing ethoxyl content. Because aromatic hydrocarbons generally permeate the cellulose ether membranes more rapidly than paraffinic hydrocarbons, an experiment under approximately the same conditions as for Run No. 1 was performed to determine whether toluene would permeate at a higher rate. The permeation rate for toluene was found to be less than about 0.2 gal./hr./1000 sq. ft. of membrane surface, affirming the results obtained in Run No. 1 as to the impermeability of membranes prepared from methyl cellulose.

The effect of temperature, membrane thickness, and ethoxyl content of the ethyl cellulose membrane upon the rate of hydrocarbon permeation and composition of the hydrocarbon permeate are shown in the following table. In the runs, performed under comparable conditions, an equal volume mixture of n-heptane and isooctane was employed as the feed hydrocarbon mixture. The feed was in contact with the membrane while in the liquid phase whereas the permeated hydrocarbons were withdrawn from the opposite side of the membrane in the vapor state. A pressure differential of 730 mm. Hg was employed across the membrane. Three types of ethyl cellulose membrane were used; Hercules Ethocel N–50, Hercules Ethocel G–100 and Dow Type 610, each of which had the previously described composition. The results obtained are set forth in Table II which follows.

Table II

| Run No. | Membrane | Membrane Thickness in Mils | Temp., °C. | Vol. Percent n-Heptane in Permeate | Rate of Permeation, Gal./Hr./ 1,000 Sq. Ft. of Membrane Surface |
|---|---|---|---|---|---|
| 5 | Hercules N-50 | 1.5 | 50 | 71 | 27 |
| 6 | do | 1.5 | 60 | 70 | 43 |
| 7 | do | 1.5 | 70 | 70 | 72 |
| 8 | do | 1.5 | 80 | 70 | 109 |
| 9 | do | 1.5 | 90 | Membrane ruptured | |
| 10 | do | 1.5 | 70 | 74 | 29 |
| 11 | do | 1.5 | 80 | 75 | 38 |
| 12 | do | 1.5 | 90 | 74 | 61 |
| 13 | do | 1.5 | 100 | 75 | 71 |
| 14 | Dow Type 610 | 3.0 | 80 | 70 | 26 |
| 15 | do | 3.0 | 90 | 70 | 33 |
| 16 | do | 3.0 | 100 | 73 | 42 |
| 17 | do | 5.0 | 80 | 75 | 14 |
| 18 | do | 5.0 | 90 | 75 | 20 |
| 19 | do | 5.0 | 100 | 75 | 26 |
| 20 | do | 7.5 | 80 | 73 | 9.7 |
| 21 | do | 7.5 | 90 | 74 | 11.6 |
| 22 | do | 7.5 | 100 | 71 | 15.5 |
| 23 | do | 10.0 | 80 | 73 | 5.8 |
| 24 | do | 10.0 | 90 | 73 | 6.9 |
| 25 | do | 10.0 | 100 | 70 | 8.7 |

The data in Table II show that the rate of hydrocarbon permeation through the ethyl cellulose membrane increases with an increase in temperature. The composition of the permeate remains approximately the same over the entire range of temperatures and membrane thickness employed, indicating that these variables in the permeation process have essentially no bearing on the selectivity of the process for particular hydrocarbons. The data show that by reducing the thickness of the membrane by one-half, the rate of hydrocarbon permeation can generally be increased by 100% or more. A remarkable three-fold increase in the permeation rate with some drop in selectivity is obtained when using Hercules N–50 membrane (ethoxyl content of 47.5–49%) over that obtained when using Hercules G–100 membrane (ethoxyl content of 44.5–45.5%), and the membrane is somewhat less stable at elevated temperatures (note Run No. 9). In other experiments with thinner G–100 membranes permeation rates as high as about 200 gal./hr./1000 sq. ft. of membrane surface have been obtained.

In order to determine whether the ability of the process to separate hydrocarbons changes with a change in composition of the feed hydrocarbon mixture, a comparable series of runs were performed using various mixtures of n-heptane and isooctane as the feed mixture. These runs were made at a temperature of approximately 52° C. and a pressure differential across the membrane of 100 mm. Hg. The hydrocarbons were present in the liquid phase in the feed zone and permeated hydrocarbons were removed as vapors. To determine whether the physical state of the feed hydrocarbons, i.e. liquid or vapor, had an influence upon the rate of permeation and/or separation of the hydrocarbons, a comparative series of runs were performed wherein the same feed hydrocarbons were in the vapor phase. In these experiments, a temperature of 52° C. and a pressure differential of 100 mm. Hg across the membrane was employed, but the absolute pressures in each zone were lower in order to maintain the feed in the vapor state. The same membrane was employed in all experiments. It was prepared from Hercules N-50 ethyl cellulose having an ethoxyl content of 47.5–49% as previously described, and the membrane was 2.0 mils in thickness. The results appear in Table III which follows:

*Table III*

| Run No. | Feed Composition Volume Percent | Physical State of Feed | Vol. Percent n-Heptane in Permeate | Sep'n. Factor [1] | Rate of Permeation, Gal./Hr./ 1,000 Sq. Ft. Membrane Surface |
|---|---|---|---|---|---|
| 26 | 60 n-heptane | liquid | 79 | 2.3 | 65 |
| 27 | 40 isooctane | vapor | 71 | 1.4 | 44 |
| 28 | 40 n-heptane | liquid | 58 | 1.9 | 64 |
| 29 | 60 isooctane | vapor | 60 | 1.9 | 45 |
| 30 | 20 n-heptane | liquid | 34 | 1.7 | 54 |
| 31 | 80 isooctane | vapor | 36 | 1.8 | 36 |

[1] Separation factor = $\dfrac{H_P I_F}{I_P H_F}$ where H and I denote the concentrations of n-heptane and isooctane respectively, and subscripts P and F denote the concentrations of the permeate and feed respectively.

The data show that the separation factor between the hydrocarbons remains approximately the same despite changes in the concentration of the components of the feed. Thus, virtually complete separation can be made between hydrocarbons. It is also observed that the separation factor remains approximately the same whether operating the permeation process with the feed hydrocarbons in the liquid or vapor phase. However, it will be noted that the rate of permeation of the hydrocarbons through the membrane occurs at a faster rate when operating with the feed hydrocarbons in the liquid phase. The rate is approximately 40–50% higher.

Thus having described the invention what is claimed is:

1. A process which comprises contacting a charge liquid hydrocarbon mixture with one side of a thin plastic membrane comprised of ethyl cellulose having an ethoxyl content of less than 47% but more than 40% by weight, permeating a portion of the liquid mixture in contact with said one side of said membrane through said membrane, and removing from the opposite side of said membrane a vaporized permeated portion having a composition different from said charge liquid hydrocarbon mixture.

2. The process of claim 1 wherein the charge liquid hydrocarbon mixture comprises a mixture of at least two hydrocarbons of differing type selected from the types of hydrocarbons consisting of aromatic hydrocarbons, unsaturated hydrocarbons, and saturated hydrocarbons.

3. The process of claim 1 wherein the charge hydrocarbon mixture boils within the gasoline boiling range.

4. The process of claim 1 wherein the charge hydrocarbon mixture is a petroleum distillate.

5. The process of claim 1 wherein the charge hydrocarbon mixture is a narrow boiling range mixture whose components boil within a range of 30° C. of each other.

References Cited in the file of this patent

UNITED STATES PATENTS

| | | |
|---|---|---|
| 2,159,434 | Frey | May 23, 1939 |
| 2,386,826 | Wallach et al. | Oct. 16, 1945 |
| 2,475,990 | Robertson | July 12, 1949 |
| 2,540,152 | Weller | Feb. 6, 1951 |

OTHER REFERENCES

"Solubility of Commercial Ethyl Cellulose," Ethocel Handbook, 1949, reprinted in Ott et al., "Cellulose," 2nd ed., New York. Interscience, 1955, pages 1457–1459.

Jost: Diffusion, New York. Academic Press, 1952, pages 269, 293 and 298.

Webster's New International Dictionary, 2nd ed., 1934, page 2396.

"Technique of Organic Chemistry, vol. III., Pt. I, Separation and Purification," by Arnold Weissberger, first ed., published by Interscience Publishers, 1956, pages 41–47.

Modern Plastics for June 1950, pages 97, 98, 100, 102, 150–152, 154, 158 (article by V. L. Simril and A. Hershberger).

UNITED STATES PATENT OFFICE
CERTIFICATION OF CORRECTION

Patent No. 2,958,657                November 1, 1960

Robert C. Binning et al.

It is hereby certified that error appears in the above numbered patent requiring correction and that the said Letters Patent should read as corrected below.

Column 2, line 43, for "employed in" read -- employed is --; column 10, Table II, second column thereof, under the heading "Membrane", opposite Run No. 10, for "do" read -- Hercules G-100 --.

Signed and sealed this 25th day of April 1961.

(SEAL)
Attest:

ERNEST W. SWIDER
Attesting Officer

DAVID L. LADD
Commissioner of Patents